E. T. Covell.
Soldering Mach.
№ 63,220.   Patented Mar. 26, 1867.

Witnesses
H. H. Young
W. Burris

Inventor
E. T. Covell
by David A. Burr
Atty

United States Patent Office.

EDWARD T. COVELL, OF BROOKLYN, NEW YORK.

Letters Patent No. 63,220, dated March 26, 1867.

---

MACHINE FOR SOLDERING METAL CANS.

---

The Schedule referred to in these Letters Patent and making part of the same.

---

TO ALL WHOM IT MAY CONCERN:

Be it known that I, EDWARD T. COVELL, of Brooklyn, in the county of Kings, and State of New York, have invented a new and improved Soldering Apparatus; and I do hereby declare that the following is a full, clear, and exact description thereof, reference being had to the accompanying drawings, forming a part of this specification, in which—

Figure 1:
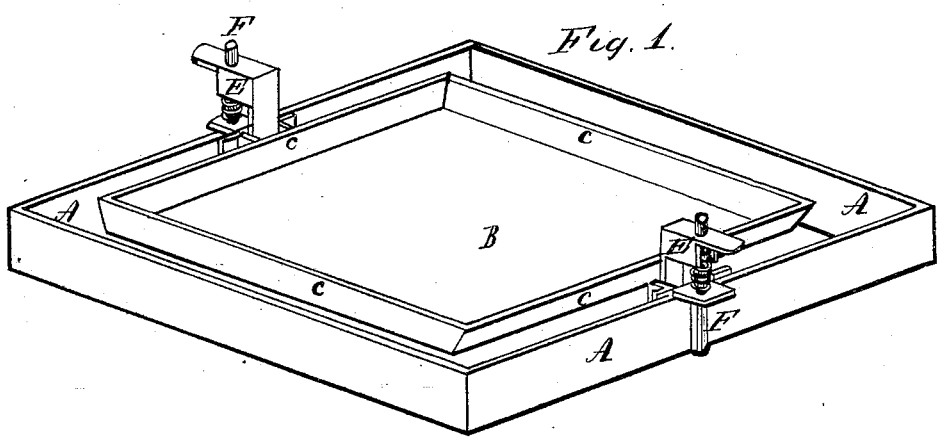

Figure 1 is a perspective view of my improved soldering apparatus; and

Figure 2:
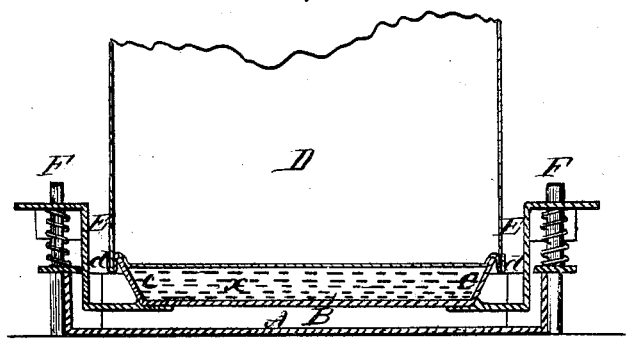

Figure 2, a central vertical section of the same, illustrating the position of a can on the supporting plate.

Similar letters of reference indicate like parts in all of the figures.

The nature of my invention consists in the combination of an adjustable supporting and protecting plate, with a suitable solder-pan, for the purpose of dipping the projecting joint of a metallic vessel in the solder contained in the pan to such depth as may be required to perfect and close the same, and at the same time to protect the bottom of the can from contact with the solder or the effects of its heat.

The solder-pan may be a simple, shallow metallic dish, A, of any desired form and dimensions, and is to be placed upon any suitable furnace. The supporting plate B, which I combine with the pan A, is likewise metallic, although it may be of soap-stone or of wood, protected from heat by a metallic lining or a suitable non-conducting composition. It may be a simple flat plate, for cans whose joints project below the base, or its edges $c\ c$ may be upturned, for cans with joints as illustrated in fig. 2 of the drawings. The upturned edges in this case serve to enclose a composition, $x$, of plaster of Paris or other good non-conductor of heat, and to support also the can D to be soldered. These edges $c\ c$ pass into the groove, recess, or angle formed by the projecting joint $d$ of the can, the plate B being of such dimensions as that its edges shall fit closely into such groove or recess, as illustrated in fig. 2. This supporting plate B is provided with stay or guide-bars E E, which, projecting therefrom, rest upon spiral springs encircling upright guide-rods F F, secured on each side of the soldering pan. These guide-rods F F, passing up through apertures pierced in the guide-bars E E, serve to retain the supporting plate B in a central position over and within the solder-pan A, as seen in the drawings, and yet permit its free vertical movement. By overcoming the resistance of the springs, by means of pressure exerted in any suitable manner upon the plate B, it may be forced down in the solder to such depth as may be necessary, the extent of motion being limited by means of suitable adjusting or set-screws upon the guide-rods or bars.

With my improved apparatus, constructed substantially as described, I am enabled to solder the joints of vessels far more quickly, with much less solder, more efficiently, and at less expense, than by the usual methods. In using it I place the soldering pan A, filled with an alloy containing a much larger quantity of lead than is admissible in solder to be applied with a soldering iron, upon any suitable furnace. I then place the supporting plate B in its proper position upon its springs and guides, as seen in fig. 2 of the drawings, so that its bottom rests upon the molten solder, leaving only that portion of the solder exposed which flows around between the upturned edges $c\ c$ of the plate and the sides of the pan. The can to be soldered, having projecting joints, as illustrated in fig. 2, being now placed upon the supporting plate B, so that the joints $d\ d$ shall project over the edges $c\ c$ thereof, the plate is forced down by means of pressure upon the can, or by means of a lever or treadle, or other equivalent device, until the joints $d\ d$ are immersed in the molten solder rising around the same, when it is then at once released, and quickly elevated to its first position by the action of the springs. The can, thus soldered, is removed to make place for another. As the outer edge of the hook-shaped flange $d$, forming the joint of the cans to be soldered, is not turned up quite so high as the interior bend forming the groove or channel along the joint, the joint may be dipped in the solder far enough to cover this edge and completely fill and close the joint without danger of its flowing through into the can or over the edge of the supporting plate to the bottom of the can. The bottom of the can is completely protected from the heat of the solder in the process by the interposed layer $x$ of plaster or its equivalent.

Different sizes and forms of supporting plates B may be used to fit various sizes of cans and different shapes thereof, whether round or square, and several such sizes and forms of supporting plates may be used with the same solder-pan by a proper arrangement and adjustment of the guide-bars and stays to the guide-rods F F of the pan.

Although I prefer to make the supporting plate B of my soldering apparatus movable and adjustable, as described, still I contemplate its combination with the solder-pan A in a fixed position, at such a height above the bottom of the pan as that, when the pan is properly filled with solder, the edges and joints of a can placed on the plate B, and projecting over it, shall be sufficiently immersed in the solder to become filled and closed thereby. In this form of my apparatus the solder is always protected (except in the narrow channel around the plate B) from the atmosphere.

Having thus fully described my invention, I claim therein as new, and desire to secure by Letters Patent—

My improved soldering apparatus, consisting of a supporting plate, B, combined with a suitable soldering pan, A, constructed and arranged substantially in the manner and for the purpose herein set forth.

The foregoing specification of my improved soldering machine signed by me this tenth day of October, A. D. 1866.

EDWD. T. COVELL.

Witnesses:
 E. M. TYRVELL,
 M. M. DUNN.